(12) United States Patent
Tsubouchi et al.

(10) Patent No.: US 11,265,508 B2
(45) Date of Patent: Mar. 1, 2022

(54) RECORDING CONTROL DEVICE, RECORDING CONTROL SYSTEM, RECORDING CONTROL METHOD, AND RECORDING CONTROL PROGRAM

(71) Applicant: JVCKENWOOD Corporation, Yokohama (JP)

(72) Inventors: Ayane Tsubouchi, Yokohama (JP); Yuki Oyama, Yokohama (JP); Ryohei Takata, Yokohama (JP); Kotaro Mantani, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/008,757

(22) Filed: Sep. 1, 2020

(65) Prior Publication Data

US 2020/0396413 A1    Dec. 17, 2020

Related U.S. Application Data

(63) Continuation of application No. PCT/JP2019/023353, filed on Jun. 12, 2019.

(30) Foreign Application Priority Data

Dec. 19, 2018   (JP) .............................. JP2018-236920

(51) Int. Cl.
*H04N 5/77* (2006.01)
*G06T 7/70* (2017.01)
(Continued)

(52) U.S. Cl.
CPC ........... *H04N 5/77* (2013.01); *G06K 9/00228* (2013.01); *G06K 9/00335* (2013.01);
(Continued)

(58) Field of Classification Search
None
See application file for complete search history.

(56) References Cited

U.S. PATENT DOCUMENTS

| | | | |
|---|---|---|---|
| 9,809,196 B1 * | 11/2017 | Penilla | .................... B60L 50/66 |
| 2007/0014439 A1 | 1/2007 | Ando | |
| 2014/0218529 A1 * | 8/2014 | Mahmoud | .......... H04N 5/23245 |
| | | | 348/148 |

FOREIGN PATENT DOCUMENTS

| | | |
|---|---|---|
| JP | 2003-348569 | 12/2003 |
| JP | 2006-259828 | 9/2006 |

(Continued)

OTHER PUBLICATIONS

International Search Report and Written Opinion for International Application No. PCT/JP2019/023353 dated Jul. 30, 2019, 8 pages.

(Continued)

*Primary Examiner* — Hung Q Dang
(74) *Attorney, Agent, or Firm* — Amin, Turocy & Watson, LLP

(57) ABSTRACT

A recording control device includes a captured data acquisition unit that acquires captured data from a camera that captures a video of surroundings of a vehicle, a parking detection unit that detects that the vehicle is parked, a moving object detection unit that detects a moving object from captured data that is acquired by the captured data acquisition unit while the vehicle is parked, a person recognition unit that recognizes that the person detected by the moving object detection unit is a person, a behavior detection unit that detects that the person recognized by the person recognition unit is performing a specific behavior at a certain distance shorter than a predetermined distance from the vehicle, and a recording control unit that stores the (Continued)

captured data as event recording data if it is detected that the person is performing the specific behavior.

6 Claims, 9 Drawing Sheets

(51) Int. Cl.
    *G06K 9/00*     (2006.01)
    *G06T 7/20*     (2017.01)
    *H04N 7/18*     (2006.01)
    *G08B 13/196*     (2006.01)
    *G07C 5/08*     (2006.01)

(52) U.S. Cl.
    CPC ..... *G06K 9/00362* (2013.01); *G06K 9/00791* (2013.01); *G06T 7/20* (2013.01); *G06T 7/70* (2017.01); *H04N 7/183* (2013.01); *G06T 2207/10016* (2013.01); *G06T 2207/30201* (2013.01); *G06T 2207/30264* (2013.01)

(56) References Cited

FOREIGN PATENT DOCUMENTS

| | | |
|---|---|---|
| JP | 2006-321357 | 11/2006 |
| JP | 2011-90645 | 5/2011 |
| KR | 20150130717 | 11/2015 |

OTHER PUBLICATIONS

Extended European Search Report for European Patent Application No. 19898647.3 dated Apr. 6, 2021.

\* cited by examiner

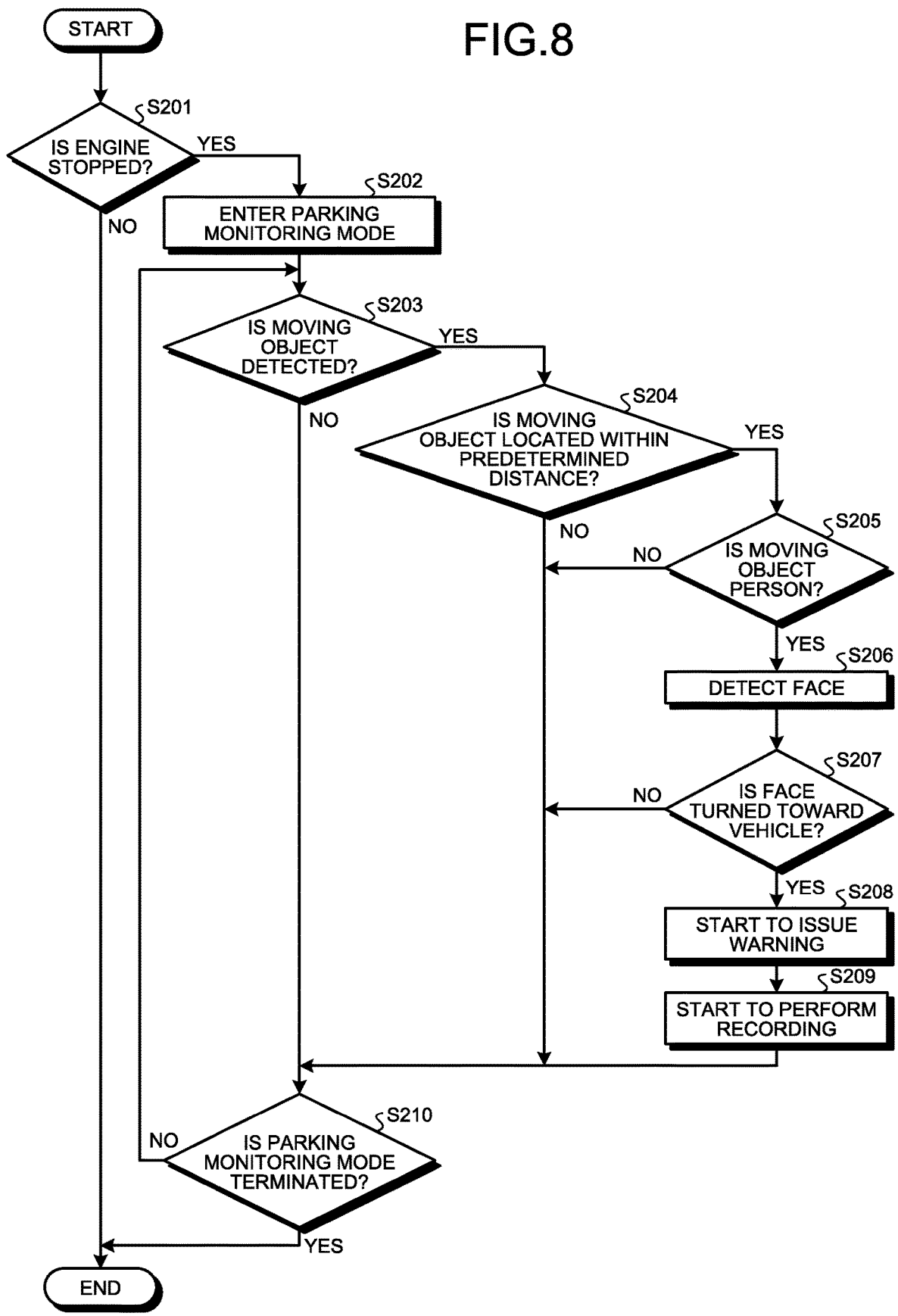

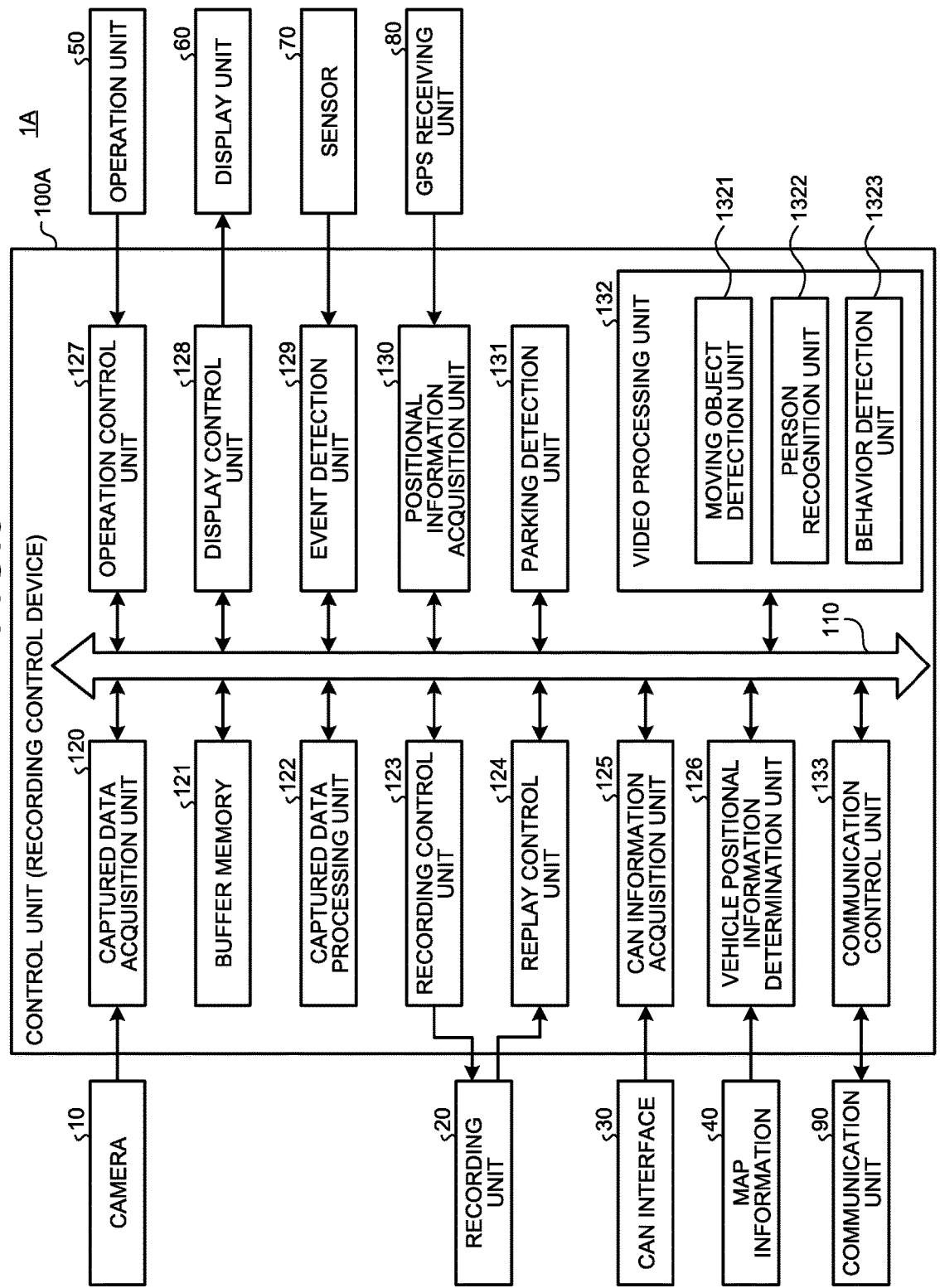

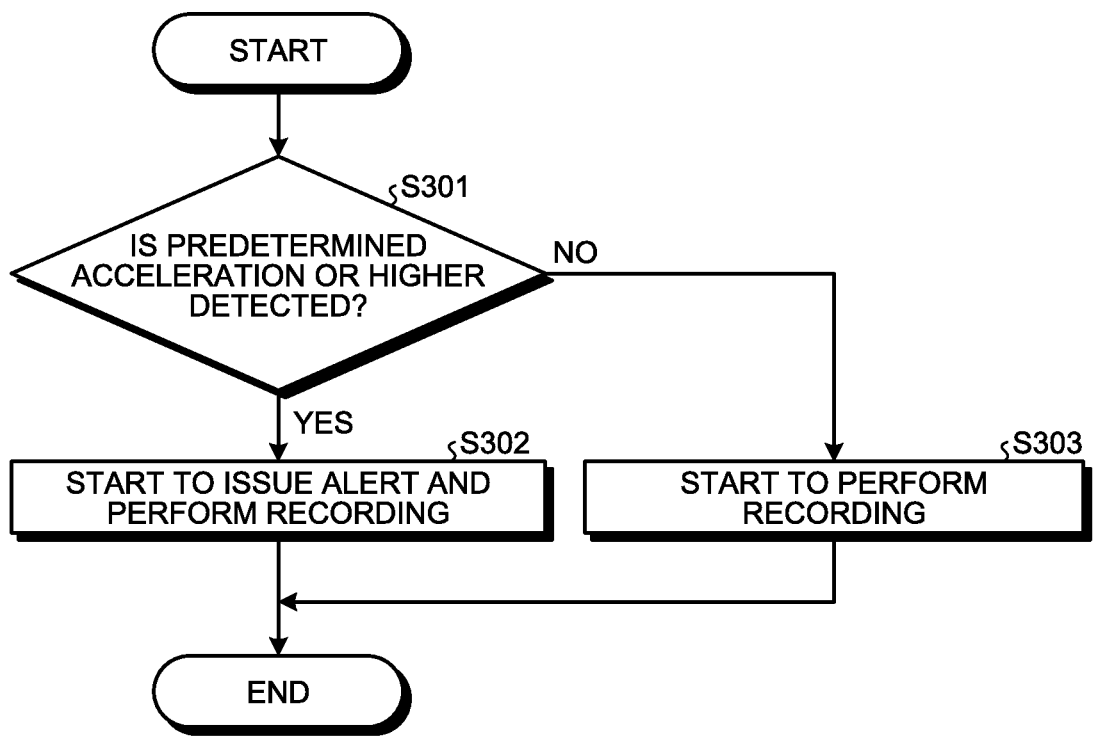

RECORDING CONTROL DEVICE, RECORDING CONTROL SYSTEM, RECORDING CONTROL METHOD, AND RECORDING CONTROL PROGRAM

CROSS-REFERENCE TO RELATED APPLICATION(S)

This application is a Continuation of PCT international application Ser. No. PCT/JP2019/023353 filed on Jun. 12, 2019 which designates the United States, incorporated herein by reference, and which claims the benefit of priority from Japanese Patent Application No. 2018-236920, filed on Dec. 19, 2018, incorporated herein by reference.

BACKGROUND

1. Technical Field

The present disclosure relates to a recording control device, a recording control system, a recording control method, and a recording control program.

2. Description of the Related Art

A technology for recording a video of a moving object when the moving object is detected around a parked vehicle has been known (for example, JP 2006-321357 A).

When parking recording is being performed by moving object detection during parking, and if a road exists in a capturing direction and vehicles or persons pass through the road, the vehicles or the persons that have passed through the road are detected as moving objects. In this case, a large amount of unnecessary event recording data may be stored, and a capacity of a recording device may be fully used.

SUMMARY

It is an object of the present disclosure to at least partially solve the problems in the conventional technology.

A recording control device according to the present disclosure comprising: a captured data acquisition unit configured to acquire captured data from a camera that captures a video of surroundings of a vehicle; a parking detection unit configured to detect that the vehicle is parked; a moving object detection unit configured to detect a moving object from captured data that is acquired by the captured data acquisition unit while the vehicle is parked; a person recognition unit configured to recognize that the moving object detected by the moving object detection unit is a person; a behavior detection unit configured to detect that the person recognized by the person recognition unit is performing a specific behavior at a certain distance shorter than a predetermined distance from the vehicle; and a recording control unit configured to store the captured data as event recording data if it is detected that the person is performing the specific behavior.

A recording control system according to the present disclosure comprising: the recording control device according to the present disclosure; a camera configured to capture a video of surroundings of the vehicle; and a recording unit configured to record the captured data.

A recording control method according to the present disclosure comprising: a captured data acquisition step of acquiring captured data from a camera that captures a video of surroundings of a vehicle; a parking detection step of detecting that the vehicle is parked; a moving object detection step of detecting a moving object from captured data that is acquired at the captured data acquisition step while the vehicle is parked; a person recognition step of recognizing that the moving object detected at the moving object detection step is a person; a behavior detection step of detecting that the person recognized at the person recognition step is performing a specific behavior at a certain distance shorter than a predetermined distance from the vehicle; and a recording control step of storing the captured data as event recording data if it is detected that the person is performing the specific behavior.

A non-transitory computer readable recording medium storing therein a recording control program according to the present disclosure that causes a computer to execute: a captured data acquisition step of acquiring captured data from a camera that captures a video of surroundings of a vehicle; a parking detection step of detecting that the vehicle is parked; a moving object detection step of detecting a moving object from captured data that is acquired at the captured data acquisition step while the vehicle is parked; a person recognition step of recognizing that the moving object detected at the moving object detection step is a person; a behavior detection step of detecting that the person recognized at the person recognition step is performing a specific behavior at a certain distance shorter than a predetermined distance from the vehicle; and a recording control step of storing the captured data as event recording data if it is detected that the person is performing the specific behavior.

BRIEF DESCRIPTION OF THE DRAWINGS

FIG. 8 is a flowchart illustrating an example of the flow of the process performed by the recording control device according to the first embodiment.

FIG. 9 is a block diagram illustrating an example of a configuration of a recording control system according to a second embodiment.

FIG. 10 is a flowchart illustrating an example of a process performed by the recording control system according to the second embodiment.

DETAILED DESCRIPTION

Embodiments of the present disclosure will be described in detail below with reference to the accompanying drawings. The present disclosure is not limited to the embodiments below, and in a case where a plurality of embodiments is provided, the present disclosure includes a configuration obtained by combining the embodiments.

First Embodiment

Figure 1:
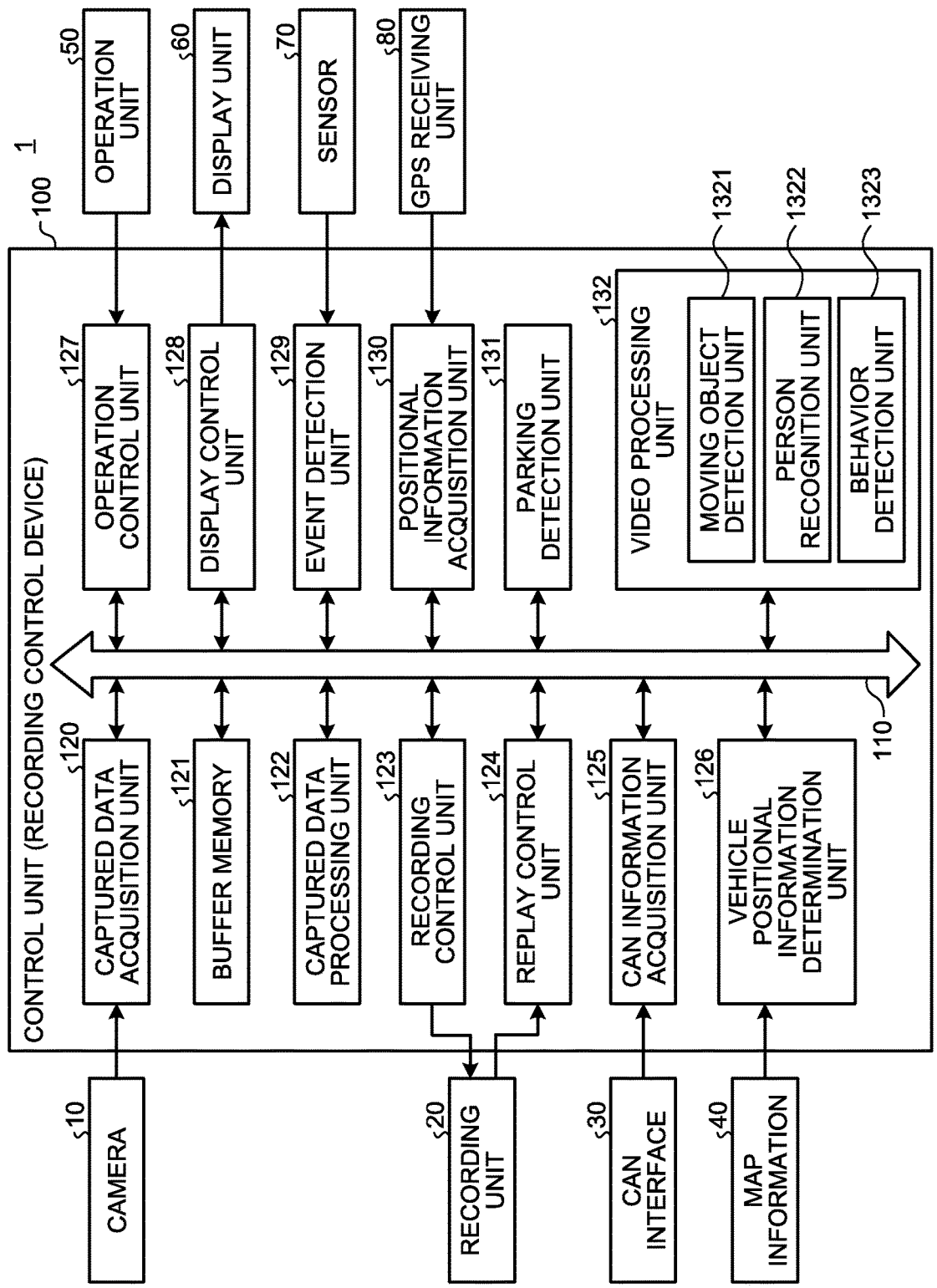
FIG. 1 is a block diagram illustrating an example of a configuration of a recording control system according to a first embodiment.

With reference to FIG. 1, a configuration of a recording control system according to a first embodiment will be described. FIG. 1 is a block diagram illustrating an example of the configuration of the recording control system according to the first embodiment.

As illustrated in FIG. 1, a recording control system 1 includes a camera 10, a recording unit 20, a controller area network (CAN) interface 30, an operation unit 50, a display unit 60, a sensor 70, a GPS receiving unit 80, and a control unit (recording control device) 100. The recording control system 1 is used in a vehicle and detects a person who is performing a specific behavior at a certain distance shorter than a predetermined distance from the vehicle on the basis of captured data that is captured during parking. Then, if a person who is performing a specific behavior is detected, the recording control system 1 starts to record the captured data.

The recording control system 1 is what is called a drive recorder that is mounted in, for example, an upper part of a windshield of the vehicle in an orientation in which a video of the front of the vehicle can be captured, detects a shock corresponding to an incident that needs to be detected as an event, such as an accident, and stores, as event recording data, captured data corresponding to a time period including a time of occurrence of the accident. The recording control system 1 is not limited to a device that is mounted as a stand-alone device on the vehicle, but may be implemented by a configuration that is realized as a function of a navigation device, a configuration that is equipped in the vehicle in advance, or a portable device that is used by being placed on the vehicle.

The camera 10 captures a video of surroundings of the vehicle on which the recording control system 1 is mounted. For example, the camera 10 may be one or a combination of a camera that captures a video of surroundings in front of the vehicle, a camera that captures a video of surroundings in the rear of the vehicle, and a camera that captures videos of surroundings on lateral sides of the vehicle, may be a camera unit including a plurality of cameras for capturing videos of surroundings of the vehicle, or may be a spherical camera. The camera 10 outputs captured data obtained by capturing a video of surroundings of the vehicle to a captured data acquisition unit 120.

The recording unit 20 records various kinds of data, such as event recording data, that is recorded upon detection of an event. For example, the recording unit 20 records captured data of a person who has performed a specific behavior at a certain distance shorter than a predetermined distance from the vehicle. For example, the recording unit 20 stores, as the event recording data, captured data corresponding to a predetermined time period among pieces of captured data of the person who has performed the specific behavior at a certain distance shorter than the predetermined distance from the vehicle. The recording unit 20 stores therein a program for implementing each of the units of the control unit 100, for example. In this case, the control unit 100 loads and executes the program stored in the recording unit 20, and implements functions of each of the units. The recording unit 20 may be realized by, for example, a semiconductor memory device, such as a random access memory (RAM), a read only memory (ROM), or a flash memory, or a storage device, such as a hard disk, a solid state drive, or an optical disk. The recording unit 20 may be constructed of a plurality of different memories or the like.

The CAN interface 30 is an interface for acquiring various kinds of vehicle information via a CAN. The vehicle information includes, for example, information on an operating condition of an engine, a travelling condition of the vehicle, and the like.

The operation unit 50 receives various kinds of operation performed on the recording control system 1. The various kinds of operation include operation of starting to replay the event recording data, operation of starting to store the event recording data, and the like. The operation unit 50 outputs an operation signal corresponding to the received operation to an operation control unit 127. The operation unit 50 may be realized by, for example, a physical button or a touch panel arranged in the display unit 60.

The display unit 60 displays various videos. The display unit 60 displays, for example, the event recording data recorded in the recording unit 20. The display unit 60 is, for example, a display including a liquid crystal display (LCD), an organic electro-luminescence (EL) display, or the like.

The sensor 70 detects various kinds of information caused by occurrence of an event on the vehicle. For example, the sensor 70 is an acceleration sensor and detects acceleration applied to the vehicle. For another example, the sensor 70 is a gyro sensor and detects information on a posture of the vehicle. The sensor 70 outputs a detection result to an event detection unit 129.

The GPS receiving unit 80 is constructed of a GPS receiving circuit, a GPS receiving antenna, and the like, and receives a GPS signal. The GPS receiving unit 80 outputs the received GPS signal to a positional information acquisition unit 130.

The control unit 100 includes the captured data acquisition unit 120, a buffer memory 121, a captured data processing unit 122, a recording control unit 123, a replay control unit 124, a CAN information acquisition unit 125, a vehicle positional information determination unit 126, the operation control unit 127, a display control unit 128, the event detection unit 129, the positional information acquisition unit 130, a parking detection unit 131, and a video processing unit 132. All of the units included in the control unit 100 are connected to one another via a bus 110. The control unit 100 may be realized by, for example, an electronic circuit including a central processing unit (CPU).

The captured data acquisition unit 120 acquires various kinds of captured data from outside. For example, the captured data acquisition unit 120 acquires captured data that is captured by the camera 10. For example, the captured data acquisition unit 120 outputs the captured data acquired from the camera 10 to the buffer memory 121 and the display control unit 128. The captured data acquisition unit 120 may acquire, as the captured data, video data that is captured by the camera 10, or may acquire captured data including voice data that is acquired by a microphone (not illustrated) arranged in the camera 10 or at a different position, in addition to the video data.

The buffer memory 121 is an internal memory of the control unit 100 for temporarily storing the captured data acquired by the captured data acquisition unit 120. Specifically, the buffer memory 121 temporarily stores therein captured data corresponding to a predetermined time period acquired by the captured data acquisition unit 120, while updating the captured data.

The captured data processing unit 122 performs various processes on the captured data that is temporarily stored in the buffer memory 121. The captured data processing unit 122 converts the captured data that is temporarily stored in the buffer memory 121 into an arbitrary file format, such as an MP4 format, that is encoded by a codec in an arbitrary format, such as H.264 or Moving Picture Experts Group (MPEG)-4. For example, the captured data processing unit 122 generates captured data as a file corresponding to a predetermined time period, from the captured data that is temporarily stored in the buffer memory 121. Specifically, for example, the captured data processing unit 122 generates, as a file, captured data corresponding to 60 seconds in recording order, from the captured data that is temporarily stored in the buffer memory 121. The captured data processing unit 122 outputs the generated captured data to the recording control unit 123. Further, the captured data processing unit 122 outputs the generated captured data to the display control unit 128. A time period for which the captured data is generated as the file is assumed as 60 seconds as one example, but embodiments are not limited to this example.

The recording control unit 123 records various kinds of data in the recording unit 20. For example, the recording control unit 123 causes the recording unit 20 to record the captured data that is generated as the file by the captured data processing unit 122.

Specifically, in a case in which recording is continuously performed, the recording control unit 123 records, as overwritable captured data, the captured data that is generated as the file by the captured data processing unit 122 in the recording unit 20, during a time period in which the event detection unit 129 does not detect an event. If a recording capacity of the recording unit 20 becomes full, the recording control unit 123 records, in an overwriting manner, new captured data in a recording area in which a piece of old captured data is recorded among pieces of the overwritable captured data recorded in the recording unit 20, for example. If the event detection unit 129 determines that an event has occurred, the recording control unit 123 stores, in the recording unit 20, captured data corresponding to a predetermined time period before, after, and including an event detection time, as event recording data for which overwriting is inhibited. For example, if it is detected that a parking position of the vehicle is located at a certain distance shorter than a predetermined distance from a road, that a capturing direction of the camera 10 is oriented toward the road, and that a person is performing a specific behavior, the recording control unit 123 determines the detection as occurrence of an event and stores, as the event recording data, captured data corresponding to the predetermined time period before and after the event detection time in the recording unit 20.

In a case in which recording is not continuously performed, the recording control unit 123 starts to perform recording from an event detection time if the event detection unit 129 determines that an event has occurred, and stores, in the recording unit 20, captured data corresponding to a predetermined time period since the detection of the event as the event recording data for which overwriting is inhibited.

The replay control unit 124 replays various kinds of data recorded in the recording unit 20. For example, the replay control unit 124 replays the captured data recorded in the recording unit 20. For example, the replay control unit 124 replays the captured data that is stored as the event recording data in the recording unit 20. Specifically, the replay control unit 124 replays the captured data in accordance with a control signal corresponding to operation on the operation unit 50, where the control signal is output from the operation control unit 127.

The CAN information acquisition unit 125 acquires various kinds of vehicle information via the CAN interface 30.

The vehicle positional information determination unit 126 refers to map information 40 with respect to a current location of the vehicle and determines a geographical condition around the vehicle. For example, the vehicle positional information determination unit 126 acquires current location information from the positional information acquisition unit 130. For example, the vehicle positional information determination unit 126 acquires the map information 40 from an external device. The map information 40 may be stored in, for example, the recording unit 20 or may be acquired from an external server via a communication unit (not illustrated). Specifically, the vehicle positional information determination unit 126 acquires information indicating a position and an orientation of the vehicle, and determines whether a parking position of the vehicle is located at a certain distance shorter than the predetermined distance and the capturing direction of the camera 10 is oriented toward the road, based together on the map information 40.

The operation control unit 127 receives, from the operation unit 50, an operation signal related to operation that is received from a user or the like. For example, the operation control unit 127 receives an operation signal related to operation of starting to replay the event recording data, operation of starting to store the event recording data, or the like. The operation control unit 127 outputs a control signal corresponding to the received operation signal to the recording control unit 123 or the replay control unit 124. In this case, the recording control unit 123 and the replay control unit 124 perform operation in accordance with the control signal.

The display control unit 128 displays various videos on the display unit 60. Specifically, the display control unit 128 outputs a video signal to the display unit 60 to thereby display a video on the display unit 60. For example, the display control unit 128 outputs a video signal related to the event recording data replayed by the replay control unit 124 to the display unit 60, to thereby cause the display unit 60 to display captured data that is stored as the event recording data. The display control unit 128 outputs a video signal related to the captured data acquired by the captured data acquisition unit 120 to the display unit 60, to thereby cause the display unit 60 to display captured data being captured.

The event detection unit 129 receives a detection result obtained by the sensor 70. The event detection unit 129 detects an event on the basis of the received detection result. For example, the event detection unit 129 acquires acceleration information on acceleration as the detection result. In this case, the event detection unit 129 detects an event based on the acceleration information. Upon detecting the event, the event detection unit 129 outputs a control signal indicating information on the detection of the event to the recording control unit 123. In this case, the recording control unit 123 stores the captured data captured by the camera 10 as the event recording data in the recording unit 20.

The event detection unit 129 detects, as acceleration corresponding to the event, acceleration corresponding to acceleration at the time the vehicle collides with a different object, such as a different vehicle, among acceleration output by the sensor 70. Detection of the acceleration corresponding to the event may be performed by adding a weight in each of an x-axis direction, a y-axis direction, and a z-axis direction in the sensor 70 that is a three-axis acceleration sensor. Further, detection of the acceleration corresponding to the event may be performed by using, as a detection target, acceleration that increases rapidly.

The positional information acquisition unit 130 receives a GPS signal from the GPS receiving unit 80. The positional information acquisition unit 130 calculates the current location information on the basis of the GPS signal. The positional information acquisition unit 130 outputs the current location information to the vehicle positional information determination unit 126.

The parking detection unit 131 detects that the vehicle is parked. For example, the parking detection unit 131 receives the vehicle information from the CAN information acquisition unit 125. The parking detection unit 131 detects, from the vehicle information, conditions, such as turning off of power, such as an engine, of the vehicle, turning off of accessory power, selection of a parking gear, operation of a parking brake, or a current location of the vehicle indicating a parking lot. The parking detection unit 131 may detect a combination of various conditions. The parking detection unit 131 detects that the vehicle is parked on the basis of the detected condition.

The video processing unit 132 performs a process of detecting a specific target object from the captured data acquired by the captured data. Specifically, the video processing unit 132 detects a target object that is included in a specific range from the vehicle in the captured data. In the first embodiment, the video processing unit 132 includes a moving object detection unit 1321, a person recognition unit 1322, and a behavior detection unit 1323.

Figure 2:
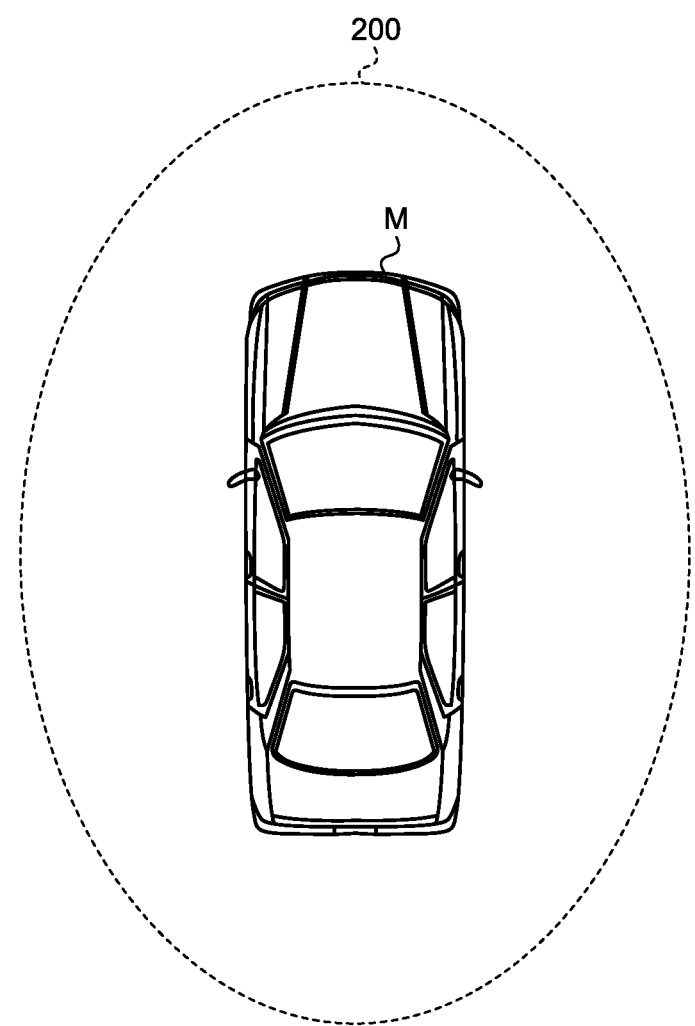
FIG. 2 is a schematic diagram for explaining a range in which a target object is to be detected.

With reference to FIG. 2, a range in which the target object is to be detected will be described. FIG. 2 is a schematic diagram for explaining the range in which the target object is to be detected. In FIG. 2, an example of a case in which a target object is detected using a camera that captures a video of an entire circumferential area of a vehicle M is illustrated.

As illustrated in FIG. 2, the vehicle M is a vehicle on which the recording control system 1 is mounted. In this case, the video processing unit 132 detects a specific target object located in a range 200 from the vehicle M in the captured data. The range 200 is a range relatively close to the vehicle M, and is a range within, for example, 1 to 2 meters from the vehicle M, but embodiments are not limited to this example.

The range 200 illustrated in FIG. 2 need not be fixed, but may be changed depending on conditions.

Figure 3:
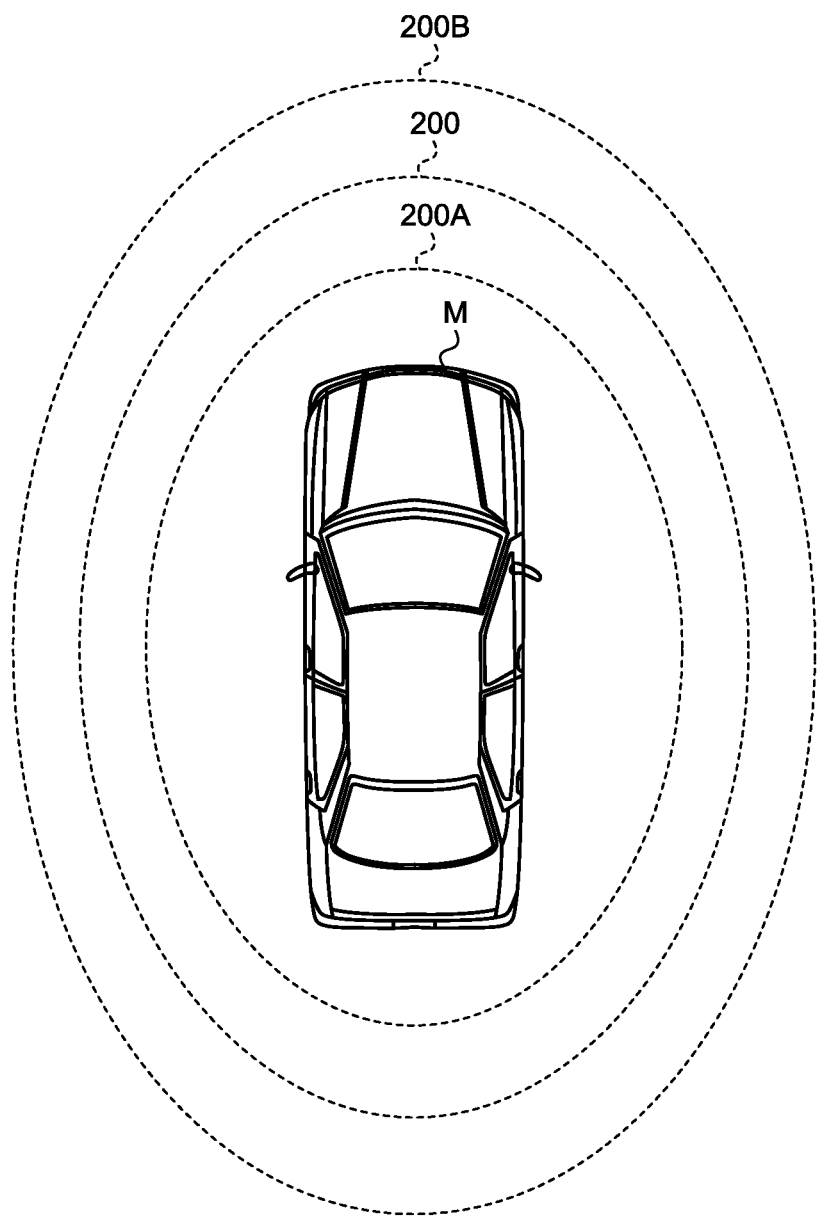
FIG. 3 is a schematic diagram for explaining the range in which the target object is to be detected.

With reference to FIG. 3, a method of changing the range in which the target object is to be detected will be described. FIG. 3 is a schematic diagram for explaining the method of changing the range in which the target object is to be detected. Even in FIG. 3, the example of the case in which a target object is detected using the camera that captures a video of the entire circumferential area of the vehicle M is illustrated.

In FIG. 3, the range 200, a range 200A, and a range 200B are illustrated. If it is desired to detect a specific target object in a narrower range than a normal range, the range in which the target object is to be detected may be reduced from the range 200 to the range 200A. Further, if it is desired to detect a specific target object in a wider range than the normal range, the range in which the target object is to be detected may be increased from the range 200 to the range 200B.

The video processing unit 132 may change the range 200 to the range 200A or the range 200B on the basis of the vehicle positional information that is calculated by the vehicle positional information determination unit 126, for example.

FIG. 1 will be referred to again. The moving object detection unit 1321 detects presence or absence of a moving object from the captured data acquired by the captured data acquisition unit 120. For example, the moving object detection unit 1321 detects a region in which luminance or color information is changed for each of frames, in units of pixels or in units of square blocks of a few pixels by a few pixels in the captured data, for example. In this case, if a temporal change is detected in a region with a predetermined size or larger, the moving object detection unit 1321 determines that a moving object is detected. Meanwhile, a method of detecting a moving object by the moving object detection unit 1321 is not limited to the example as described above, and it may be possible to detect a moving object using a well-known method.

The person recognition unit 1322 recognizes a person from the captured data acquired by the captured data acquisition unit 120. For example, the person recognition unit 1322 detects that a moving object is a person by, for example, comparing a region constituting the moving object detected by the moving object detection unit 1321 and a person recognition dictionary stored in a storage unit (not illustrated). The person recognition unit 1322 recognizes a moving person by performing a person recognition process on the moving object detected by the moving object detection unit 1321. The person recognition unit 1322 detects a distance between the recognized person and the vehicle M on the basis of a lowermost position of a pixel range indicating the recognized person. The person recognition unit 1322 performs face recognition on the recognized person and detects an orientation of a face of the recognized person. As for the orientation of the face, for example, it is possible to determine whether the face is turned toward the vehicle M by recognizing a positional relationship among eyes, a nose, and a mouth. The person recognition unit 1322 determines identity of the recognized person on the basis of a feature amount of the recognized person. The person recognition unit 1322 may detect the distance between the person as the detected moving object and the vehicle M on the basis of a size of the face detected for the recognized person or a distance between parts of the face.

The behavior detection unit 1323 detects that the person recognized by the person recognition unit 1322 is performing a specific behavior at a certain distance shorter than the predetermined distance from the vehicle M, on the basis of a recognition result obtained by the person recognition unit 1322. The behavior detection unit 1323 detects, as the specific behavior, a behavior in which the recognized person is turning his/her face toward the vehicle for a predetermined time period or longer, on the basis of a face recognition result of the recognized person. Here, the predetermined time period is not specifically limited, but may be a few seconds (for example, three seconds) or longer. Further, the predetermined time period may be changed in accordance with a request from a user.

The behavior detection unit 1323 detects, as the specific behavior, a behavior in which the recognized person passes by the vehicle M multiple times in a predetermined time period, on the basis of information for identifying the recognized person. For example, the behavior detection unit 1323 detects, as the specific behavior, a behavior in which the recognized person passes by the vehicle M twice or more in the predetermined time period, such as 10 minutes, while turning his/her face toward the vehicle M. For example, the behavior detection unit 1323 may detect, as the specific behavior, a behavior in which the recognized person approaches while turning his/her face toward the vehicle. In other words, the behavior detection unit 1323 detects that the recognized person looks inside the vehicle for hunting something or walks back and forth repeatedly around the vehicle M.

Figure 4:
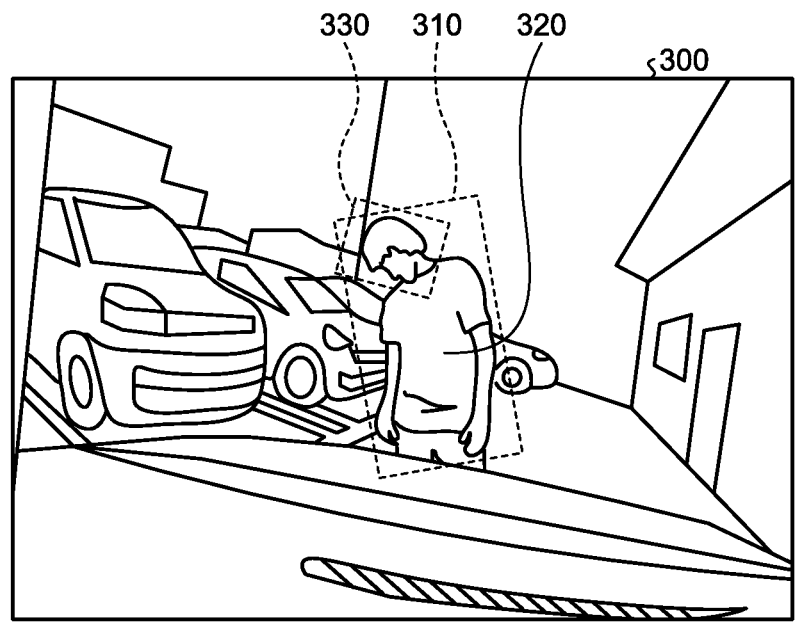
FIG. 4 is a schematic diagram illustrating an example of captured data.

Processes performed by the moving object detection unit 1321, the person recognition unit 1322, and the behavior detection unit 1323 will be described in detail with reference to FIG. 4. FIG. 4 is a schematic diagram illustrating an example of the captured data acquired by the captured data acquisition unit 120.

The moving object detection unit 1321 detects a moving object region 310 including a moving object from captured data 300, for example. In this case, the person recognition unit 1322 performs a person recognition process on the moving object region 310, and recognizes a person 320 included in the moving object region 310. The person recognition unit 1322 performs a face recognition process on the person 320, and detects a face region 330. The person recognition unit 1322 detects an orientation of a face of the person 320 on the basis of the face region 330. Then, the behavior detection unit 1323 determines that the person 320 is performing a specific behavior if the person 320 is turning his/her face toward the vehicle for a predetermined time period or longer, on the basis of the orientation of the face of the person 320 detected by the person recognition unit 1322.

As illustrated in FIG. 4, if the person who is performing the specific behavior with respect to the vehicle is detected, the recording control unit 123 stores captured data corresponding to the predetermined time period as the event recording data. In other words, the recording control unit 123 regards the person who is performing the specific behavior with respect to the vehicle as a suspicious person, and stores captured data in which the person is captured as the event recording data.

During a time period in which the vehicle is operating, the control unit 100 detects an event based on output from the sensor 70 and stores the event recording data when an event occurs. During a time period in which the vehicle is parked, the control unit 100 detects an event based on a detection result obtained by the moving object detection unit 1321 and stores the event recording data when an event occurs. During the time period in which the vehicle is parked, the control unit 100 may also detect an event based on output from the sensor 70, in addition to detecting an event based on the detection result obtained by the moving object detection unit 1321. The control unit 100 detects an event and stores the event recording data by operating as a parking monitoring mode while the vehicle is parked.

Further, in the processes described above with reference to FIG. 4, a predetermined person that is registered in advance may be excluded from a suspicious person detection process. Here, the predetermined person may be an owner of the vehicle, family members of the owner of the vehicle, or friends of the owner of the vehicle. The persons as described above are registered, in advance, detection excluded persons in a storage unit (not illustrated), for example. With this configuration, it is possible to exclude the registered persons from targets of the suspicious person detection process.

Figure 5:
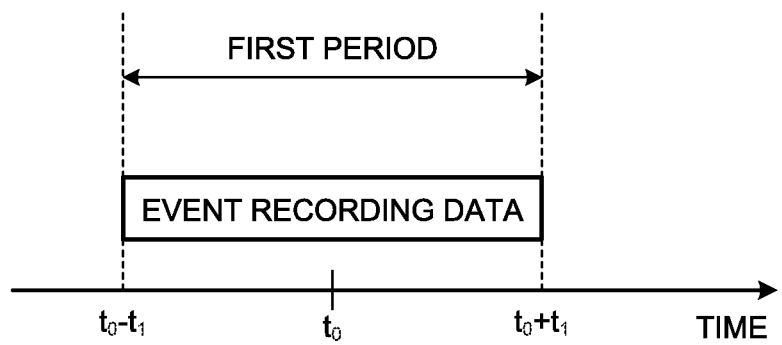
FIG. 5 is a schematic diagram for explaining a method of storing event recording data.
Figure 6:
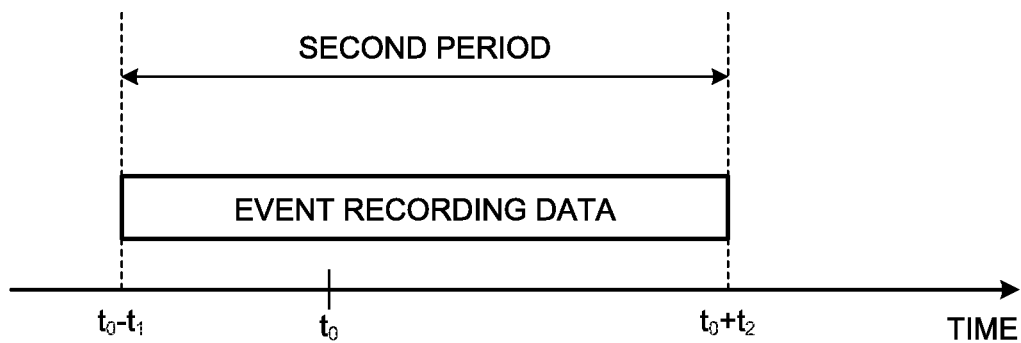
FIG. 6 is a schematic diagram for explaining the method of storing the event recording data.

A method of storing the event recording data will be described with reference to FIG. 5 and FIG. 6. FIG. 5 is a schematic diagram for explaining a method of storing normal event recording data. FIG. 6 is a schematic diagram for explaining a method of storing event recording data in a case in which a suspicious person is detected.

As illustrated in FIG. 5, for example, if an event is detected at a time $t_0$, captured data corresponding to a first period from $t_0-t_1$ to $t_0+t_1$, which is a time period before and after the time $t_0$, is stored as event recording data. The time period corresponding to the captured data that is stored as the event recording data is not specifically limited, and may be, for example, 30 seconds before and after the time at which the event is detected. The event recording data illustrated in FIG. 5 is event recording data corresponding to a collision accident, for example.

As illustrated in FIG. 6, for example, if a suspicious person is detected at the time $t_0$, captured data corresponding to a second period from $t_0-t_1$ to $t_0+t_2$, which is a time period before and after the time $t_0$, is stored as event recording data. Here, $t_2$ is a time period longer than $t_1$. In other words, if the suspicious person is detected, a time period taken after detection of the suspicious person is set to be longer than a time period taken before detection of the suspicious person. In this case, for example, a sum of 10 seconds before detection of the suspicious person and a few minutes (for example, one to two minutes) after detection of the suspicious person is stored as the event recording data. In other words, the second period is longer than the first period illustrated in FIG. 5. Meanwhile, the time period to be stored as the event recording data is not limited to the examples as described above.

The recording control system 1 may include a warning unit that issues a warning to the person 320 upon detecting the person 320 who is performing the specific behavior. In this case, the recording control system 1 may issue a warning to the person 320 using a warning sound, or may issue a warning by voice saying "step away from the vehicle", for example.

Figure 7:
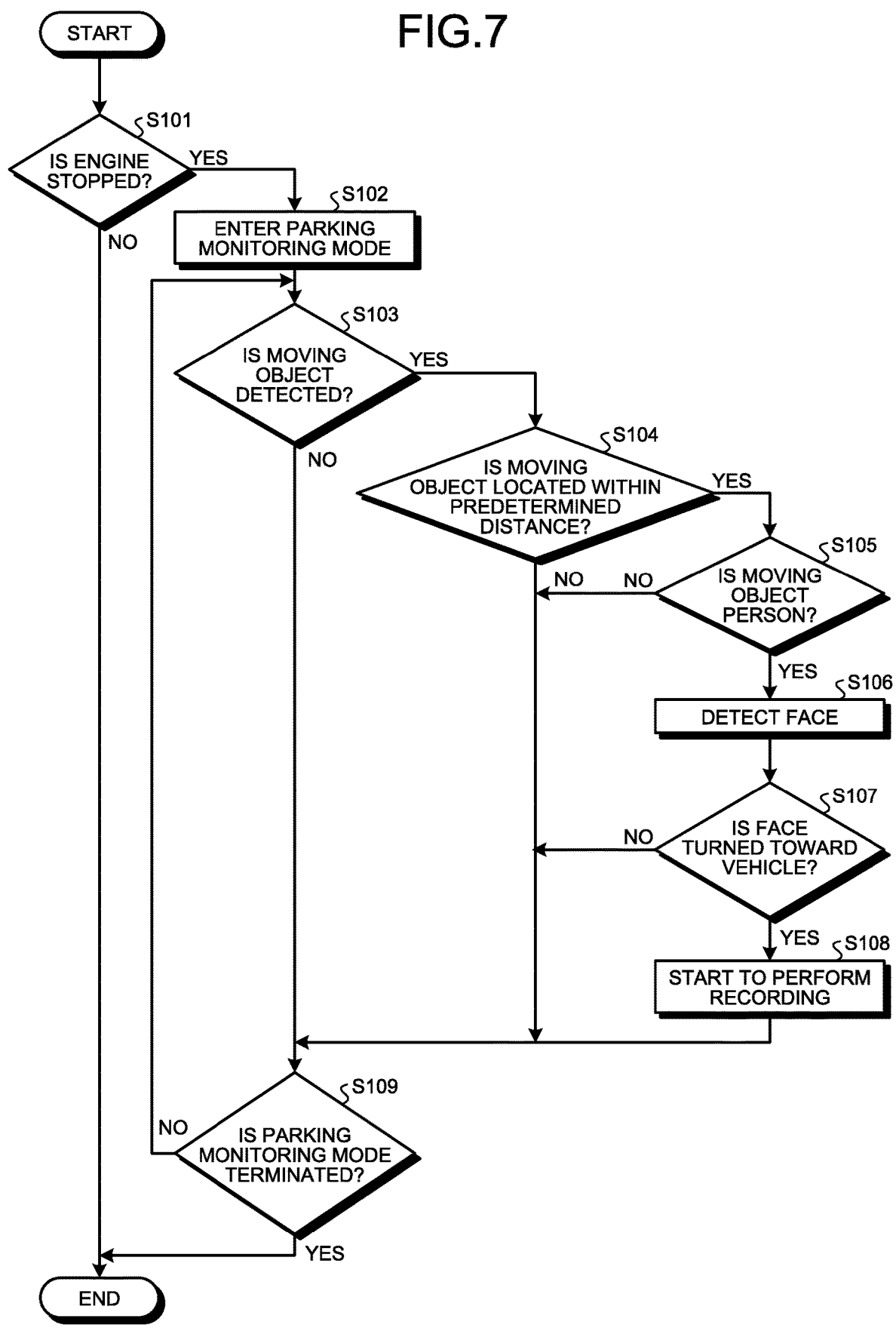
FIG. 7 is a flowchart illustrating an example of the flow of a process performed by a recording control device according to the first embodiment.

A process performed by the control unit according to the first embodiment will be described with reference to FIG. 7. FIG. 7 is a flowchart illustrating an example of the flow of the process performed by the control unit according to the first embodiment.

The control unit 100, at Step S101, determines whether the vehicle is parked. For example, the control unit 100 determines whether the vehicle is parked on the basis of vehicle information acquired via a CAN or the like.

At Step S101, if it is determined that the vehicle is not parked (No at Step S101), the control unit 100 terminates the process illustrated in FIG. 7. In this case, while the process illustrated in FIG. 7 is terminated, the control unit 100 continues to detect an event by detecting acceleration because the vehicle is in a state of not being parked. In contrast, if it is determined that the vehicle is parked (Yes at Step S101), the control unit 100 proceeds to Step S102.

Subsequently, the control unit 100 enters the parking monitoring mode to capture videos of surroundings of the vehicle (Step S102). Then, the control unit 100 proceeds to Step S103.

Upon entering the parking monitoring mode, the control unit 100 starts to detect a moving object around the vehicle.

At Step S103, after starting detection of a moving object, if it is detected that a moving object is not detected (No at Step S103), the control unit 100 proceeds to Step S109. In contrast, if it is determined that a moving object is detected (Yes at Step S103), the control unit 100 proceeds to Step S104.

Subsequently, at Step S104, the control unit 100 determines whether the detected moving object is located within a predetermined distance from the vehicle (Step S104).

If it is determined that a distance between the detected object and the vehicle is not within the predetermined distance (No at Step S104), the control unit 100 proceeds to Step S109. In contrast, if the distance between the detected object and the vehicle is within the predetermined distance (Yes at Step S104), the control unit 100 proceeds to Step S105.

Subsequently, at Step S105, the control unit 100 determines whether the moving object detected within the predetermined distance is a person (Step S105).

If the moving object detected within the predetermined distance is not a person (No at Step S105), the control unit 100 proceeds to Step S109. In contrast, if the moving object detected within the predetermined distance is a person (Yes at Step S105), the control unit 100 proceeds to Step S106.

Subsequently, the control unit 100 detects a face of the moving object that is determined as the person at Step S105 (Step S106). Then, the control unit 100 proceeds to Step S107. The control unit 100 may detect the distance between the person who is the detected moving object and the vehicle M on the basis of a size of the face of the person detected at Step S106 or on the basis of a distance between parts of the face. In this case, determination of the distance between the vehicle M and the moving object at Step S104 will be performed after Step S106.

Subsequently, at Step S107, the control unit 100 determines whether the detected person's face is turned toward the vehicle.

If it is determined that the detected person's face is not turned toward the vehicle (No at Step S107), the control unit 100 proceeds to Step S109. In contrast, if the detected person's face is turned toward the vehicle (Yes at Step S107), the control unit 100 proceeds to Step S108.

Subsequently, the control unit 100 starts to store, as the event recording data, captured data of the detected person in the recording unit 20 (Step S108). Then, the control unit 100 proceeds to Step S109.

At Step S109, the control unit 100 determines whether the parking monitoring mode is terminated. If it is determined that the parking monitoring mode is not terminated (No at Step S109), the control unit 100 proceeds to Step S103. In contrast, if it is determined that the parking monitoring mode is terminated (Yes at Step S109), the control unit 100 terminates the process illustrated in FIG. 7.

A process that is different from the process illustrated in FIG. 7 and that is performed by the control unit 100 will be described with reference to FIG. 8. FIG. 8 is a flowchart illustrating an example of the flow of the process that is different from the process in FIG. 7 and that is performed by the control unit 100.

Step S201 to Step S207 are the same as Step S101 to Step S107 illustrated in FIG. 7, and therefore, explanation thereof will be omitted.

After determination of Yes is made at Step S207, the control unit 100 starts to issue a warning to the detected person (Step S208). Then, the control unit 100 proceeds to Step S209.

Step S209 and Step S210 are the same as Step S108 and Step S109 illustrated in FIG. 7, and therefore, explanation thereof will be omitted. Meanwhile, the control unit 100 may perform the processes at Step S208 and Step S209 in parallel.

As described above, in the first embodiment, in a case in which a person is detected within a certain distance shorter than a predetermined distance from the vehicle and the person is performing a specific behavior, captured data in which the person is captured is recorded as the event recording data. With this configuration, it is possible to prevent a capacity of a recording unit from being fully used for unnecessary captured data.

Second Embodiment

A display control device according to a second embodiment will be described with reference to FIG. 9. FIG. 9 is a block diagram illustrating an example of a configuration of the display control device according to the second embodiment.

As illustrated in FIG. 9, a recording control system 1A includes the camera 10, the recording unit 20, the CAN interface 30, the operation unit 50, the display unit 60, the sensor 70, the GPS receiving unit 80, a communication unit 90, and a control unit (recording control device) 100A. The control unit 100A includes the captured data acquisition unit 120, the buffer memory 121, the captured data processing unit 122, the recording control unit 123, the replay control unit 124, the CAN information acquisition unit 125, the vehicle positional information determination unit 126, the operation control unit 127, the display control unit 128, the event detection unit 129, the positional information acquisition unit 130, the parking detection unit 131, the video processing unit 132, and a communication control unit 133. In other words, the recording control system 1A is different from the recording control system 1 in that the recording control system 1A includes the communication unit 90 and the communication control unit 133.

The communication unit 90 performs information communication with external information processing devices via a wired or wireless network (not illustrated). For example, the communication unit 90 performs information communication between the control unit 100 and a cloud server. Specifically, the communication unit 90 transmits the event recording data that is recorded in the recording unit 20 to the cloud server under the control of the communication control unit 133. Accordingly, the event recording data is stored in the cloud server. In this case, a user is able to access the event recording data recorded in the cloud server, via a terminal device of the user. Here, examples of the terminal device include a personal computer (PC), a smartphone, and a tablet terminal, but embodiments are not limited to these examples.

The communication control unit 133 transmits various kinds of information to outside via the communication unit 90. For example, the communication control unit 133 transmits the event recording data to the cloud server or the like. For example, when the event detection unit 129 detects a predetermined event, the communication control unit 133 may transmit the event recording data to a public agency, such as a police.

For example, it is assumed that the event detection unit 129 has acquired information on predetermined acceleration or higher from the sensor 70 in a state in which a person who is performing a predetermined behavior is detected. In this case, for example, the event detection unit 129 determines that it is necessary to transmit the event recording data to a police or the like. In this case, the event detection unit 129 outputs, to the communication control unit 133, a control signal for transmitting the event recording data to a police or the like. In this case, the communication control unit 133 transmits the event recording data to a police or the like in accordance with the control signal received from the event detection unit 129.

A process performed by the control unit 100A to alert a police or the like after detecting a person who is performing a predetermined behavior will be described with reference to FIG. 10. FIG. 10 is a flowchart illustrating an example of the flow of the process of alerting a police by the control unit 100A. Meanwhile, the flowchart in FIG. 10 indicates a process to be performed after Step S107 illustrated in FIG. 7.

First, after a person who is performing a predetermined behavior has been detected, the control unit 100A determines, at Step S301, whether predetermined acceleration or higher is detected. The acceleration to be detected at Step S301 is set to be smaller acceleration than the acceleration at which it is determined that an event has occurred due to collision of a different vehicle with the vehicle. The acceleration detected here is acceleration that occurs when a scratch is made on the vehicle, when a part is removed, or when the vehicle is broken into, for example.

If the predetermined acceleration or higher is detected (Yes at Step S301), the control unit 100A proceeds to Step S302, alerts a police or the like by transmitting the event recording data to the police or the like, and stores the event recording data in the recording unit 20 (Step S302). At Step S302, the control unit 100A may store the event recording data in the cloud server. Then, the control unit 100A terminates the process illustrated in FIG. 10.

In contrast, if the predetermined acceleration or higher is not detected (No at Step S301), the control unit 100A stores the event recording data in the recording unit 20 (Step S303). The event recording data stored at Step S303 is the same as the data stored at Step S108 in FIG. 7 and at Step S209 in FIG. 8. At Step S303, the control unit 100A may store the event recording data in the cloud server. Then, the control unit 100A terminates the process illustrated in FIG. 10.

As described above, in the second embodiment, it is possible to store the event recording data in the cloud server or the like via the communication unit. With this configuration, in the second embodiment, it is possible to further prevent the capacity of the recording unit from being fully used for unnecessary event recording data.

While the embodiments of the present disclosure have been explained above, embodiments are not limited by the contents of the above-described embodiments. Further, the constituent elements described above include one that can be easily thought of by a person skilled in the art, one that is practically identical, and one that is within an equivalent range. Furthermore, the constituent elements described above may be combined appropriately. Moreover, within the scope not departing from the gist of the embodiments described above, various omission, replacement, and modifications of the constituent elements may be made.

An object of the present disclosure is to provide a recording device, a recording control system, a recording control method, and a recording control program capable of recording an appropriate event.

According to the present disclosure, it is possible to record an appropriate event.

What is claimed is:

1. A recording control device comprising:
an electronic circuit including a central processing unit that is configured to:
acquire captured data from a camera that captures a video of surroundings of a vehicle;
detect that the vehicle is parked;
detect a moving object from captured data that is acquired by the central processing unit while the vehicle is parked;
recognize that the moving object detected by the central processing unit is a person;
detect that the person recognized by the central processing unit is performing a specific behavior at a certain distance shorter than a predetermined distance from the vehicle;
acquire information indicating a position and an orientation of the vehicle, refer to surrounding map information on the vehicle, and determine whether a parking position of the vehicle is located at a certain distance shorter than a predetermined distance from a road and whether a capturing direction of the camera is oriented toward the road; and
store the captured data as event recording data if it is detected that the parking position of the vehicle is located at a certain distance shorter than the predetermined distance from the road, that the capturing direction of the camera is oriented toward the road, and that the person is performing the specific behavior.

2. The recording control device according to claim 1, wherein the central processing unit detects a face of the person and an orientation of the face, and detects, as the specific behavior, a behavior in which the person is turning the face toward the vehicle for a predetermined time period or longer.

3. The recording control device according to claim 1, wherein the central processing unit detects, as the specific behavior, a behavior in which the person passes by the vehicle multiple times in a predetermined time period, on the basis of information for identifying the person.

4. A recording control system comprising:
the recording control device according to claim 1;
a camera configured to capture a video of surroundings of the vehicle; and
a recorder configured to record the captured data.

5. A recording control method comprising:
an electronic circuit including a central processing unit that is configured to perform operations comprising:
acquiring captured data from a camera that captures a video of surroundings of a vehicle;
detecting that the vehicle is parked;
detecting a moving object from captured data that is acquired by the central processing unit while the vehicle is parked;
recognizing that the moving object detected by the central processing unit is a person;
detecting that the person recognized by the central processing unit is performing a specific behavior at a certain distance shorter than a predetermined distance from the vehicle;
acquiring information indicating a position and an orientation of the vehicle, referring to surrounding map information on the vehicle, and determining whether a parking position of the vehicle is located at a certain distance shorter than a predetermined distance from a road and whether a capturing direction of the camera is oriented toward the road; and
storing the captured data as event recording data if it is detected that the parking position of the vehicle is located at a certain distance shorter than the predetermined distance from the road, that the capturing direction of the camera is oriented toward the road, and that the person is performing the specific behavior.

6. A non-transitory computer readable recording medium storing therein a recording control program that causes an electronic circuit including a central processing unit in a computer to perform operations comprising:
acquiring captured data from a camera that captures a video of surroundings of a vehicle;
detecting that the vehicle is parked;
detecting a moving object from captured data that is acquired by the central processing unit while the vehicle is parked;
recognizing that the moving object detected by the central processing unit is a person;

detecting that the person recognized by the central processing unit is performing a specific behavior at a certain distance shorter than a predetermined distance from the vehicle;

acquiring information indicating a position and an orientation of the vehicle, referring to surrounding map information on the vehicle, and determining whether a parking position of the vehicle is located at a certain distance shorter than a predetermined distance from a road and whether a capturing direction of the camera is oriented toward the road; and storing the captured data as event recording data if it is detected that the parking position of the vehicle is located at a certain distance shorter than the predetermined distance from the road, that the capturing direction of the camera is oriented toward the road, and that the person is performing the specific behavior.

* * * * *